Sept. 8, 1964    LE ROY O. KITTELSON    3,147,747
VALVES FOR INTERNAL COMBUSTION ENGINES
Filed June 24, 1963

INVENTOR.
LEROY O. KITTELSON
BY Smith & Mattern
ATTORNEYS

United States Patent Office 3,147,747
Patented Sept. 8, 1964

3,147,747
VALVES FOR INTERNAL COMBUSTION ENGINES
Le Roy O. Kittelson, Seattle, Wash., assignor to Engineering Development Corporation, Seattle, Wash., a corporation of Washington
Filed June 24, 1963, Ser. No. 289,838
4 Claims. (Cl. 123—188)

This invention relates to valves for internal combustion engines which in gas and diesel engines are subjected to operating conditions reaching temperatures as high as 1400° F. The purpose of the invention is to extend substantially the operating life of such valves and to prevent their breakage before the normal end of their useful operating-sealing life.

Briefly, the invention concerns forming an initial valve body, having a regular stem section, continuous undersize bell section, and a substantially full diameter thinner head section, from a metal, having a relatively low coefficient of expansion, high strength and ductility, such as a steel alloy. Thereafter, a collar of substantial thickness is welded continuously around bell and head sections of the initial valve body. The collar extends from the outer periphery of the head section approximately to and above the juncture of stem and bell sections. The deposited metal has excellent anti-corrosive, anti-erosive, anti-shock resistance properties derived from an alloy containing principally cobalt and chromium. Finally, a machining and polishing of the formed and welded valve produces the resulting contour of the valve to meet particular engine specifications for proper sealing operation. The valve as thus made utilizes sufficient collar materials so all of the attributes of such special alloys, wherein they remain "hot hard" during critical operating temperatures, are fully utilized to produce a better heat transfer performance. This is accomplished by using greater quantities of such collar materials strategically placed on head and bell sections whereby a better heat transfer path results within collar material, the path terminating farther from the operating head along the stem than in previously manufactured or re-conditioned valves.

Figure 1:
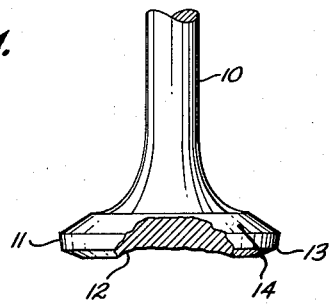

The need for increasing the deposit of resistant alloys, forming them into such a collar which not only provides the heat transfer path but in addition strengthens the entire head structure, was determined by observance of valves removed from internal combustion engines following their breakage or during periods of premature overhauls. In FIGURE 1 is shown a valve 10 removed from an engine after use to illustrate what was observed. Although slightly exaggerated for illustrative purposes, the originally flat valve head 11 was seen to have a concave 12 configuration. Such concavity is believed to result from continuing operating shock conditions wherein impact forces during engine operations are primarily transmitted through the valve seat to the periphery 13 of the frusto-conical sealing portions 14 of the valve 10.

This off-center, non-parallel, often occurring impact force, occurring at high temperatures essentially distorts the valve, as indicated. Once the deformation becomes excessive the valve begins to fail in its sealing-valving function permitting the onrush of hot gasses through the channeling spaces and past the valves. Excessive burning out of valve portions occurs eventually resulting in excessive valve leakage and breakage.

Compliance with at least one requirement is now known to be necessary in order to avoid, or substantially eliminate this concave-like deformation and thereby increase the valve operating life. The utilization of hot hard anti-corrosive, anti-erosive, anti-impact shock-resistant materials must be increased in substantial depth and extended beyond their mere utilization at frusto-conical sealing portions of valve heads. Such utilization strengthens the valves for physical impact attacks and provides the heat transfer path which reduces build up of excessive heat at high temperatures in sealing surfaces of the valves.

Figure 2:
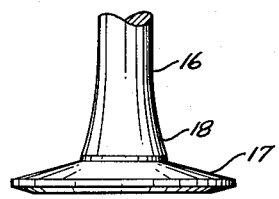

As illustrated in FIGURE 2, the initial valve body blank 16 in head 17 and bell portions 18 for a particular valve structure is substantially reduced in size to accommodate increased use of "hot hard" collar materials. There remains, however, complete continuity of initial valve body materials. The maintenance of such continuity is preferably and necessary because properties of such body structure, such as the low coefficient of expansion, high strength and ductility, must be relied upon. The placement of the collar material does not interefere with uniform expansion of other valve body materials.

Figure 3:
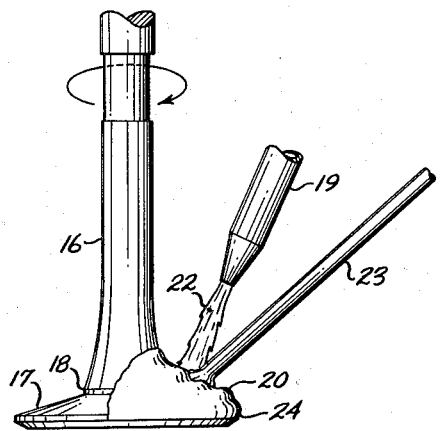

In FIGURE 3, by way of example, an oxygen-acetylene welding 19 method is indicated, wherein collar materials 20 are melted and deposited for bonding around head 17 and bell 18 portions of a valve blank 16 while the body is rotated. The oxygen-acetylene flame 22 is directed to the end of the welding rod 23, melting the collar material for its plastic flow and adherence to the valve body 16.

Prior to this welding step, but following preparation of the valve body in a forming operation such as forging or casting and in possibly utilizing further machine operations, the valve body 16, as necessary, may be thoroughly cleaned, degreased and possibly protected with a non-interfering temporary surface seal assuring continued cleanliness of valve body surfaces which are to receive the plastic flow of the collar material 20.

The collar material 20 is supplied in substantial depth equaling and slightly bettering the depth required to match exterior dimensions of the total valve as set forth in a particular engine specification. The collar material 20 covers the outer periphery 24 of the full diameter of the valve head section 17 and continuously extends under the valve head along the bell section 18 and beyond to a substantial distance 25 along the stem 26 completely surrounding the entire changing diameters of the valve body 16 in such location.

This astute placement of collar materials 20 so they form their "hot hard" function, not only at frusto-conical peripheral portions 27 of the valve 16 but also at the balance of the head 17 and well unto the stem 26 surfaces, thereby maintains the physical strength of the valve 16 and conducts heat away from the critical area gradually dispensing heat farther down the valve stem 26.

Final forming and finishing operations are undertaken by first machining the valve to near final specification dimensions and thereafter polishing valve surfaces to final dimensions thoroughly eliminating any surface imperfections.

Figure 4:
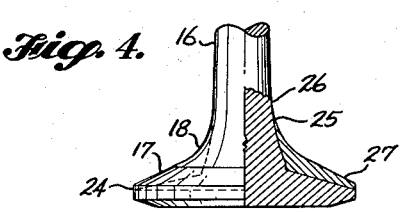

The preferred final resulting structure of the valve made by this method is illustrated in FIGURE 4. On the left side of the center line the exterior of the valve is shown, with dotted lines indicating the relative positions of the two dissimilar alloys utilized. On the right side of the center line a partial section is shown indicating the same relationship of the placement of dissimilar alloys which are employed cooperatively together to provide overall strength and endurance objectives of the valve.

By way of example, a material which has been found satisfactory for the collar portion of this valve is referred to as "Stellite No. 6," which is understood to contain essentially about 65% cobalt, 30% chromium, and 5% tungsten. A close temperature control within the melting temperature range of collar material is necessary while "Stellite" is laid down as a welding deposit. In this way, there will be substantially no intermingling of metals of resulting valves. The "Stellite" remains substantially free of valve body alloys, so the "Stellite" maintains its special properties which are required at full red heat operation conditions encountered around the valve head. In this way, hard properties and resistance to corrosion and erosion of "Stellite" is assured as the valve experiences as many as 2,000 forceful blows per minute, at pressures of 30,000 pounds per square inch, under operating conditions in the neighborhood of 1400° Fahrenheit.

Also, by way of example, valve stem and valve portions are preferably made from an austenitic steel alloy. Following proper heat treatment the stem portions extend into ferritic head portions. The composition of such an alloy would have, in addition to iron, chromium, for example at 18%, nickel at 4%, molybdenum at 3% and perhaps nitrogen at 0.15%.

The depositing of "Stellite," either while a valve is rotated or while a welding rod is moved around a valve, results in a circular and/or spiral like "Stellite" deposit configuration in which there is believed to be a comparable "Stellite" grain pattern. This circular and/or spiral like "Stellite" grain pattern overlies the valve body where its grain pattern is believed to be at first axial in the stem and thereafter radial through the head. Such distinguishable grain pattern directions in a valve body and its "Stellite" collar are believed to increase substantially the overall valve strength.

In summary, the invention is concerned with the resulting valves having an initial body, head, and bell valve portions which receive, subsequently, an extensive collar material which retains its strength at high temperature operating conditions and conducts heat away more readily from the valve head structure along the valve body to prolong, outstandingly, the operating life of the valve.

I claim:

1. A poppet valve for an internal combustion engine comprising an initial valve body including a regular stem section, a continuous undersize bell section and a substantially full diameter thinner head section made of a metal having high strength and ductility such as a steel alloy, and a collar of substantial thickness formed continuously around bell and head sections of the initial valve body from the outer periphery of the head section to and beyond the juncture of the stem and bell sections made of a metal alloy having greater anti-corrosive, anti-erosive and anti-impact shock resistance properties such as cobalt and chromium alloy.

2. A poppet valve for an internal combustion engine comprising an initial valve body including a regular stem section, a continuous undersize bell section and a substantially full diameter thinner head section made of a metal having high strength and ductility such as a steel alloy, and a collar of substantial thickness arranged in a circular-spiral-like configuration continuously around bell and head sections of the initial valve body from the outer periphery of the head section to and beyond the juncture of the stem and bell sections made of a metal alloy having greater anti-corrosive, anti-erosive and anti-impact shock resistance properties such as cobalt and chromium alloy.

3. In the poppet valve, as claimed in claim 2, the collar having a grain structure which is in a spiral configuration adjacent the valve body wherein the grain structure of the valve body is first axially in the stem and thereafter radially throughout the head.

4. A valve for internal combustion engines composed of at least two portions having different metallurgical specifications which together result in an overall full size valve, comprising: an initial valve body portion, which in turn comprises an essentially regular stem section, a continuous undersize bell section, and a substantially full diameter-but-thinner head section, all sections of this portion being made of a metal having high strength and ductility, such as a steel alloy; and a collar portion of substantial thickness, to fully size the overall valve, which is arranged continuously around the bell and head sections of the initial valve body portion from the outer periphery of the head section to and beyond the juncture of the stem and bell sections and which is made of a metal alloy having greater anti-corrosive, anti-erosive and anti-impact shock resistance properties, such as a cobalt and chromium alloy.

References Cited in the file of this patent

UNITED STATES PATENTS

| | | |
|---|---|---|
| 1,354,019 | Brush | Sept. 28, 1920 |
| 1,438,597 | Jardine | Dec. 12, 1922 |
| 2,273,250 | Charlton | Feb. 17, 1942 |
| 2,407,561 | Lincoln | Sept. 10, 1946 |
| 2,513,939 | Hoern | July 4, 1950 |
| 2,745,777 | Clarke | May 15, 1956 |
| 2,881,750 | Hanink | Apr. 14, 1959 |
| 3,040,417 | Newton | June 26, 1962 |